Jan. 15, 1963 E. NEANDER ET AL 3,073,962
PHOTOELECTRIC TRACER APPARATUS EMPLOYING A SECOND
PHOTOELECTRIC CELL FOR PATH REVERSAL
Filed June 30, 1959
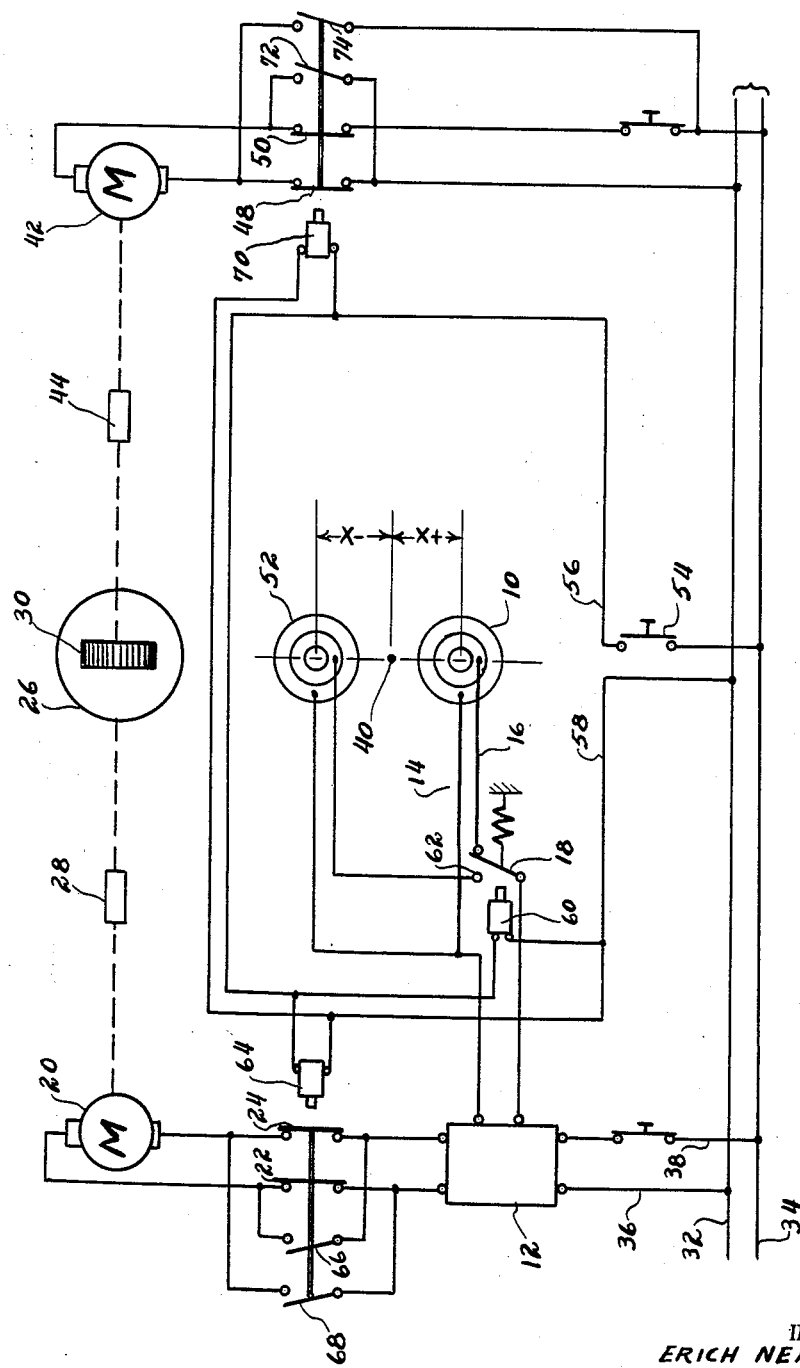
INVENTORS
ERICH NEANDER
GEORG RODER
BY
ATTORNEYS

United States Patent Office 3,073,962
Patented Jan. 15, 1963

3,073,962
PHOTOELECTRIC TRACER APPARATUS EMPLOYING A SECOND PHOTOELECTRIC CELL FOR PATH REVERSAL
Erich Neander, Weisskirchen, Taunus, and Georg Roder, Frankfurt am Main, Germany, assignors to American Messer Corporation, New York, N.Y., a corporation of New York
Filed June 30, 1959, Ser. No. 824,125
4 Claims. (Cl. 250—202)

This invention relates to a photoelectric sensor, and more particularly, to a driven photoelectric sensor the direction of which may be easily reversible.

In many applications the movement of a working apparatus such as a cutting torch is controlled by and is synchronously related to the movement of a driven photoelectric sensor. The photoelectric sensor is mounted in scanning relationship over a drawing and is driven thereacross. The photoelectric cell in the sensor will generate a signal which varies as the photoelectric cell deviates from a predetermined path imprinted on the drawing. The photoelectric cell output is then employed to change the direction of sensor movement to return the photoelectric cell to the predetermined path on the scale drawing.

It is often necessary to reverse the direction of travel of the sensor to move it and the controlled apparatus back over the predetermined path. For example, if a flame cutting torch is controlled by the sensor, failure of the cutting torch such as the flash back necessitates return of the cutting torch back along the cut path far enough so that the torch may be reignited, the work piece preheated and, upon resumption of the cutting, the torch positioned to properly pick up the cutting path.

For such reversal, it has been necessary, in the sensors employed by the prior art, to physically rotate the sensor 180° to provide for reversal of the direction of travel along the path imprinted on the drawing. After correction of the fault in the controlled apparatus, the sensor must again be rotated 180° to resume forward travel along the predetermined path.

In view of the increased operating speeds of modern equipment, and in view of the economic necessity for automating such equipment, manual reversal of the sensor mechanism and observation of the movement of the control apparatus during such backward movement is unnecessarily complex and expensive.

It is, therefore, the object of this invention to provide an improved means for reversing the direction of travel of a driven sensor mechanism along a traced path.

In accordance with this object there is provided in a preferred embodiment of this invention a driven sensor, the direction of travel of which is controlled in response to variations in output of a first photoelectric cell mounted in scanning relationship above a drawing. A second photoelectric cell is carried by the sensor in tracing relationship above the drawing. During forward travel of the sensor, the second photoelectric cell is not employed for control purposes. However, for reversal of direction, the second photo-electric cell is simultaneously connected so that it controls the direction of sensor movement and the first photocell is disabled from effecting such control. Simultaneous with rendering of a second photocell operable for control purposes, the sensor drive is reversed to drive the sensor back along the traced path in controlled manner.

A preferred embodiment of this invention is illustrated in the accompanying schematic diagram.

In the diagram there is shown a sensor mechanism having a first annular photocell 10 mounted in scanning relationship above a drawing having a path to be followed imprinted thereon. The annular photocell is arranged about a small beam of light from a source (not shown). Alternately, the path may interrupt light from a source below the sensor. An apparatus employing such an arrangement is shown in application, Serial No. 824,124, filed June 30, 1959, for Photoelectric Tracer Apparatus Employing Interrupted Light.

In operation of both arrangements, the photocell scans a field of view which is bisected by the edge between the path imprinted on the drawing and the drawing background. Thus, if the sensor deviates from the path to encompass within its field of view more of the background of the drawing, the light reflected to the photocell will increase and the amplitude of the signal therefrom will correspondingly increase. If the photocell field of view encompasses a greater portion of the dark path imprinted on the drawing, the light reflected thereto will decrease and the amplitude of the signal generated thereby will correspondingly decrease.

The signal variation representative of the direction of deviation of the sensor from the desired path is applied to a control amplifier 12 over leads 14, 16 and through switch contact 18. A control amplifier will apply the necessary corrective signal to motor 20 through switch contacts 22 and 24 to rotate the driving wheel housing 26 through a suitable transmission 28. Rotation of the housing 26 will rotate the driving wheel 30 about an axis perpendicular to the scale drawing to reposition the sensor 10 in proper relationship to the scanned path. Power for the control amplifier 12 is derived from the power busses 32, 34 through leads 36, 38.

The axis of rotation of the sensor mechanism is located at 40. Thus, the photoelectric cell is located before the axis of rotation as the sensor is driven in the forward direction. Thus, the photoelectric cell will generate an output anticipating deviations of the rotational axis 40 from the path over which it is desired that the axis move. By appropriately adjusting the control amplifier for rotation of the driving wheel 30 with respect to the speed of movement of the sensor, control of the sensor can be effected in known manner to keep the axis 40 above the predetermined path on the drawing during its travel.

The driving wheel 30 is rotated by motor 42 through suitable transmission 44. Power to energize the motor 42 is supplied from the power busses 32, 34 through switch contacts 48 and 50.

For reversal of the sensor a second annular photocell 52 is positioned in scanning relationship to the drawing. When it is desired that the second photocell be employed for control of direction of movement of the sensor, a momentary contact switch 54 is depressed to apply power over leads 56, 58 from the control buss to solenoid 60. Energizing of the solenoid 60 will move switch contactor 18 into electrical engagement with terminal 62, simultaneously disconnecting the output from the photocell 10 and connecting the output from the photocell 52 to the control amplifier 12. To avoid readjustment of the amplifier characteristics, the photocell 52 is located the same distance behind the axis of rotation of the sensor 40 as photocell 10 is located before the axis of rotation. This is indicated on the drawing by the symbols of plus and minus X wherein X represents a distance determined by the speed of drive and the response characteristics of the control loop governing change of the direction of the driving wheel.

Since the signal amplitude from the photocell 52 will indicate the same directional deviation of the sensor from the predetermined path on the drawing and since the photocell is located behind the axis of rotation, the direction of rotation of the driving wheel in response to photocell control signals must be reversed. Reversal of the direction of rotation of motor 20 with respect to signal amplitude is provided by solenoid 64 and associated contacts 66 and 68. Solenoid 64 is energized from busses 32 and 34 simultaneously with application of power therefrom to solenoid 60. Operation of the solenoid 64 will open contacts 22 and 24 and close contacts 66 and 68 to reverse the connection of the terminals of the amplifier 12 to the terminal of motor 20.

Similarly, solenoid 70 is simultaneously energized with the application to power of solenoid 60 to open contacts 48, 50 and close contacts 72 and 74 to reverse connections of the terminals of motor 42 to the power busses 32, 34. Thus, rotation of the motor 42 is reversed to drive the driving wheel 30 in the opposite direction and thus reverse the direction of travel of the sensor.

Thus, in operation of a sensor controlled apparatus employing the present invention, an operator need only depress the momentary contact switch 54 which can be conveniently located near the operator's position to reverse the direction of travel of the sensor and the associated controlled apparatus such as a cutting torch in the event of apapratus failure. The operator need only observe movement of the controlled apparatus since the sensor will automatically travel along the drawing path. The apparatus fault can then be corrected and after correction the sensor returned to forward movement by the release of the switch 50.

It will be understood that the invention can be variously modified and embodied within the scope of the subjoined claims.

What is claimed is:

1. In combination, a sensor comprising a first and second photoelectric cell movably mounted over a drawing in scanning relationship thereto, each of said photoelectric cells adapted to generate an output signal the amplitude of which varies with the deviation of said cell from a predetermined path on said drawing, means for moving said sensor over said drawing, means responsive to an output signal for turning said means about a rotational axis, means for coupling said output signal from said first photoelectric cell to said signal responsive turning means, means for simultaneously coupling said output signal from said second photoelectric cell to said signal responsive means and disabling the coupling of said output signal of said first photoelectric cell therefrom, and means simultaneously operatable with said last named means for reversing the direction of movement of said moving means.

2. A combination in accordance with claim 1 in which said first and second photoelectric cells and said rotational axis are in a single plane with said axis midway between said cells.

3. A combination in accordance with claim 1 in which said turning means includes means for amplifying said output signal and means for coupling said amplified signal to said turning means with a first polarity and which includes means simultaneously operable with said coupling and disabling means for coupling said amplified signal to said turning means with a second polarity.

4. In combination with a sensor adapted to be driven over a drawing, a first photoelectric cell positioned above said drawing in scanning relationship thereto, means responsive to an output signal from said first photoelectric cell for moving said sensor along a predetermined path over said drawing, a second photocell positioned above said drawing in scanning relationship thereto, and means responsive to an output signal from said second photoelectric cell for moving said sensor along said path in a direction opposite to the direction of movement of said sensor when moved by said moving means responsive to said first photoelectric cell.

References Cited in the file of this patent

UNITED STATES PATENTS

| | | |
|---|---|---|
| 2,419,641 | Hart | Apr. 29, 1947 |
| 2,445,041 | Scholz | July 13, 1948 |
| 2,868,993 | Henry | Jan. 13, 1959 |